United States Patent
Khoche (10) Patent No.: US 11,239,678 B2
(45) Date of Patent: Feb. 1, 2022

(54) LOW-COST TASK SPECIFIC DEVICE SCHEDULING SYSTEM

(71) Applicant: Ajay Khoche, West San Jose, CA (US)

(72) Inventor: Ajay Khoche, West San Jose, CA (US)

(*) Notice: Subject to any disclaimer, the term of this patent is extended or adjusted under 35 U.S.C. 154(b) by 184 days.

(21) Appl. No.: 16/517,561

(22) Filed: Jul. 20, 2019

(65) Prior Publication Data

US 2020/0028377 A1 Jan. 23, 2020

Related U.S. Application Data

(60) Provisional application No. 62/702,185, filed on Jul. 23, 2018.

(51) Int. Cl.
*H02J 7/00* (2006.01)
*G06F 9/38* (2018.01)
*G06F 9/48* (2006.01)
*H02J 50/80* (2016.01)

(52) U.S. Cl.
CPC .......... *H02J 7/0071* (2020.01); *G06F 9/3836* (2013.01); *G06F 9/4881* (2013.01); *H02J 50/80* (2016.02)

(58) Field of Classification Search
CPC ........ H02J 7/0071; H02J 50/80; H02J 50/001; H02J 2207/10; H02J 9/005; H02J 7/345; G06F 9/3836; G06F 9/4881; G06F 2209/484
See application file for complete search history.

(56) References Cited

U.S. PATENT DOCUMENTS

| | | | |
|---|---|---|---|
| 7,765,559 B2 | 7/2010 | Chichkov et al. | |
| 7,772,720 B2 | 8/2010 | McGee et al. | |
| 9,176,562 B2 * | 11/2015 | de Wit | G06F 1/3203 |
| 9,848,388 B1 | 12/2017 | Ravipati et al. | |
| 10,153,650 B2 | 12/2018 | Scanaill et al. | |
| 2017/0170675 A1 * | 6/2017 | Ni Scanaill | H02J 7/34 |
| 2017/0329377 A1 * | 11/2017 | Varma | G06F 1/206 |
| 2019/0340038 A1 * | 11/2019 | Molloy | G06F 9/4881 |
| 2020/0028377 A1 * | 1/2020 | Khoche | H02J 50/80 |
| 2020/0412164 A1 * | 12/2020 | Miller | H02J 7/0068 |

* cited by examiner

*Primary Examiner* — Stacy Whitmore (57) ABSTRACT

A low-cost task specific device system for scheduling tasks that are performed by one or more devices is described. After a preceding task is performed, the performance of a successive task is delayed for a task-specific recharge interval associated with the preceding task. The successive task is performed after the task-specific recharge interval has expired.

18 Claims, 7 Drawing Sheets

| Task | Recharge Interval Duration | |
|---|---|---|
| Task 1 (e.g., Transit Msg) | $T_{M(i)}$ | |
| Task 2 (e.g., Receive Msg) | $T_{M(i)}$ | |
| Task 3 (e.g., Sensor Read) | $T_{M(i)}$ | |
| Task 4 (e.g., Memory R/W) | $T_{M(i)}$ | |

FIG. 4

| Task | Recharge Interval Duration ($T_{RI}(i)$) |
|---|---|
| Task 1 (e.g., Transit Msg) | $T_{RI}(i,1) = a(1) \cdot T_1 + T_{Padding}$ |
| Task 2 (e.g., Receive Msg) | $T_{RI}(i,2) = \alpha(2) \cdot T_2 + T_{Padding}$ |
| Task 3 (e.g., Sensor Read) | $T_{RI}(i,3) = \alpha(3) \cdot T_3 + T_{Padding}$ |
| Task 4 (e.g., Memory R/W) | $T_{RI}(i,4) = \alpha(4) \cdot T_4 + T_{Padding}$ |

LOW-COST TASK SPECIFIC DEVICE SCHEDULING SYSTEM

TECHNICAL FIELD

Embodiments disclosed herein generally relate to wireless communications devices and systems for scheduling the same.

BACKGROUND

Long-range wireless communications devices, such as cellular communications devices, require a high operating current during transmit and receive cycles. Conventional primary electrochemical cell batteries either are not capable of providing the high instantaneous current pulse that is required, or experience a voltage drop during the high current pulse. Such performance limitations can cause high-power communications devices to shutdown abruptly, making them unreliable. In an effort to avoid such unpredictable call disconnections, it has been proposed to use a supercapacitor in parallel with a battery to provide the high instantaneous current needed to avoid unexpected call failures. The supercapacitor can be charged by a secondary battery or other energy source, and can be repeatedly charged and discharged without reducing its charge capacity over time.

Supercapacitors have been proposed for use in powering Internet of Things (IoT) devices to perform a variety of different tasks. In these approaches, the performance of each task is contingent on there being a threshold voltage or charge level to carry out the task. For this reason, many IoT and other electronic devices include means for measuring voltage levels, charge levels, and other parameter values that associated with various circuit components. These sensing and evaluating components, however, increase the size, weight, form factor, energy requirements, costs, and points of potential failure in the electronic devices.

SUMMARY

In an example, a device module system includes an energy source, a supercapacitor chargeable by the energy source and configured to source power to one or more device modules, and a controller. The controller is configured to distribute power from the supercapacitor to a selected one of the one or more device modules based on one or more instructions that, when executed by the controller, causes the controller to perform operations. The operations include: distributing power from the supercapacitor to the selected device module to perform a preceding task; after the preceding task is performed, delaying performance of a successive task for a task-specific recharge interval associated with the preceding task; and after the task-specific recharge interval has expired, performing the successive task.

Another example features a device module task scheduling method. In accordance with this method, energy is proved from an energy source. Energy is sourced from the energy source to charge a supercapacitor and one or more device modules. A controller distributes power from the supercapacitor to one of the device modules to perform a preceding task. After the preceding task is performed, performance of a successive task is delayed for a task-specific recharge interval associated with the preceding task. After the task-specific recharge interval has expired, the successive task is performed.

Another example features a computer program product executable by a computer system and including at least one non-transitory computer-readable medium having computer-readable program code portions embodied therein. The computer program product includes an executable code portion to selectively distribute power from an energy source to charge a supercapacitor, a controller, and one or more device modules. The computer program product further includes an executable code portion to distribute power from the supercapacitor to a selected one of the one or more device modules to perform a preceding task. The computer program product also includes an executable code portion to, after the preceding task is performed, delay performance of a successive device module task for a task-specific recharge interval associated with the preceding task. The computer program product additionally includes an executable code portion to, after the task-specific recharge interval has expired, perform the successive device module task.

The following disclosure features methods, apparatus operable to implement the methods described herein, and computer-readable media storing computer-readable instructions causing a computer to implement the methods described herein.

DESCRIPTION OF DRAWINGS

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

DETAILED DESCRIPTION

Introduction

For many applications, high current communications tasks do not have to be carried out with realtime performance. Instead, there may be a delay between the time data is generated and the time it is transmitted. For example, in many data monitoring or tracking applications, the sensed data does not have to be transmitted immediately upon receipt; instead, there can be a delay between data collection and transmission. In this process, the sensed data may be transmitted in a single transmission per cycle or in multiple transmissions per cycle depending on the size of the supercapacitor and the amount of data to be transmitted. In some examples, the data transmission and data reception tasks are performed during scheduled communications windows.

The present invention is not limited in any way to the embodiments described herein. Instead, the embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" include information about data objects or characteristics thereof.

The terms "module," "manager," and "unit" refer to hardware, software, or firmware, or a combination thereof.

The term "Internet of Things" refers to the interconnection of electronic devices embedded in objects via one or more networks (e.g., the internet) that enable those objects to send and/or receive data.

Exemplary Embodiments

Figure 1:
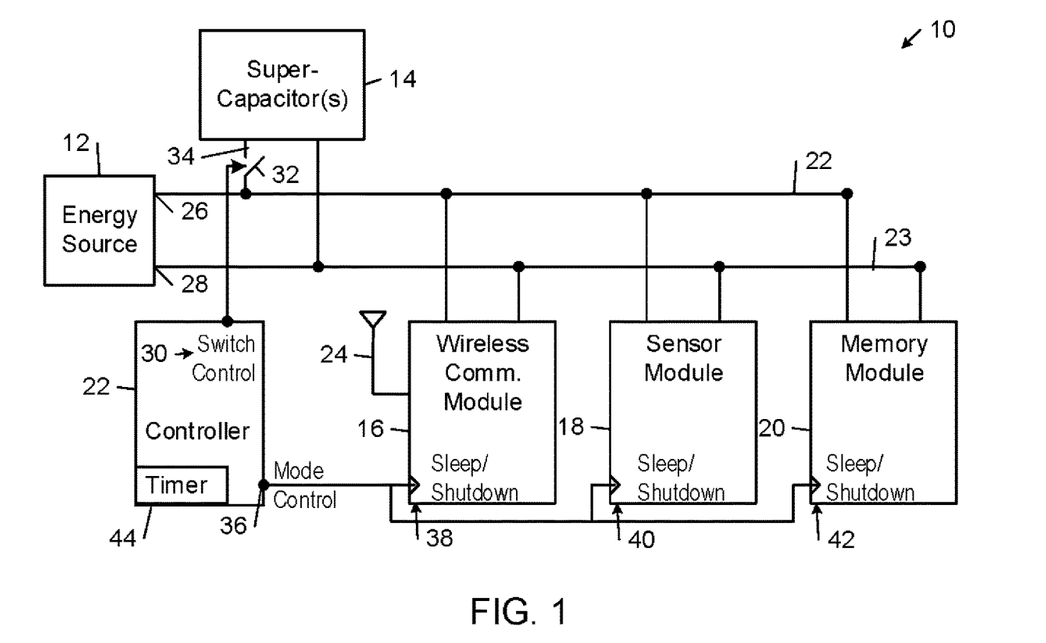
FIG. 1 is a schematic diagram of an IoT device that includes an energy source, an example set of device modules, and an example of a system for powering the set of device modules.

FIG. 1 shows a schematic diagram of an IoT device 10 that includes an energy source 12, a supercapacitor 14, an example set of device modules 16, 18, 20, and a controller 22 that manages the powering of and operations performed by the device modules 16, 18, 20.

The energy source 12 may be any suitable source of electrical power, including a standard electrochemical cell battery, a rechargeable battery, an energy harvesting system, or a combination of multiple of these sources of electrical power. An energy harvesting system can generate electrical power from energy sources in the ambient environment, including, for example, electro-magnetic waves (e.g., radio-frequency waves), solar radiation, thermal gradients, wind, and mechanical motion. In the illustrated embodiment, the energy source 12 outputs a direct current (DC) that flows over a pair of power lines 22, 23 from a positive terminal 26 to a negative terminal 28.

The supercapacitor 14 may be any type of supercapacitor. In an example, the supercapacitor 14 is implemented by an electrochemical capacitor that includes multiple parallel plate electrodes that are separated by an ion-permeable membrane and an electrolyte that ionically connects the electrodes to form an electric double layer capacitor. Other suitable supercapacitor types, such as an electrochemical pseudocapacitor or a lithium-ion capacitor, may be used either alone or in combination with the electrochemical capacitor.

In the illustrated embodiment, the set of device modules 16, 18, 20 includes a wireless communications module 14, a sensor module 16, and a memory module 18. The IoT device 10 may include a variety of additional modules and other components.

The wireless communications module 16 includes an antenna 24 and may be configured to communicate with any of a variety of different radio communications technologies, including include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. In some examples, the wireless communications module 14 is configured to receive locationing information from a satellite system (e.g., GPS, GLONASS, and NAVSTAR), cell towers, or wireless access points, and wirelessly transmit the locationing information to a network service to ascertain the physical location of the IoT device 10.

The sensor module 18 includes one or more sensors, including a capacitive sensor, an altimeter, a gyroscope, an accelerometer, a temperature sensor, a strain sensor, a pressure sensor, a light sensor, and a humidity sensor. In accordance with the instructions received by the controller 22. The sensor module 16 is configured to perform one or more sensing operations with one or more of the sensors to generate sensor data (e.g., capacitive sensing data, altitude data, orientation and angular velocity data, acceleration data, temperature data, strain data, pressure data, light data, and humidity data). In some examples, the sensor module 18 may store the data generated by the one or more sensors in a data storage device in the memory module 20.

The memory module 20 includes one or more machine-readable media storing data structures (e.g., sensor data) and programmatic instructions (e.g., software) executable by the controller 22 to perform operations including executing the operations or tasks performed by the device modules 16, 18, 20. In some examples, the programmatic instructions are stored exclusively on the machine-readable media in the memory module 20. In other embodiments, the programmatic instructions are stored on one or more machine-readable media in the controller 22. In still other embodiments, a subset of the programmatic instructions is stored in the memory module 18 and the remainder of the programmatic instructions is stored in the controller 22. In another embodiment, respective portions of the programmatic instructions are stored in respective memory components of the controller 12, the wireless communications module 14, the sensor module 16, and the memory module 18.

The controller 22 manages the operation of the IoT device 10. The controller 22 typically includes a processor (e.g., a microprocessor), a memory for storing programmatic instructions and data, and a circuit that interconnects the processor, the memory, and a source of electrical power. In the illustrated embodiment, the controller 22 also includes a switch control 30 for a switch 32 to selectively connect the positive terminal 34 of the supercapacitor 14 to the positive circuit power line 22 and selectively disconnect the positive circuit power line 22 from the positive terminal 34 of the supercapacitor 14.

In some examples, the controller 22 also outputs a respective mode control signal 36 with a respective mode control setting 38, 40, 42 that sets the operational mode of each device module 16, 18, 20. In the illustrated example, each device module 16, 18, 20 can be switched between an active operational mode, a sleep operational mode, and a shutdown operational mode. In other examples, one or more of the device modules 16, 18, 20 may only switch between an active operational mode and a shutdown operational mode.

In still other examples, one or more of the device modules 16, 18, 20 may only be in an active operational mode.

In the active operational mode, a device module 16, 18, 20 operates with full functionality and maximum power levels. In the sleep mode (also referred to as the standby mode), a device module can quickly wake to the active mode, via an interrupt. In some examples, the controller's high-frequency clock runs in the sleep mode, but the clock tree that drives the controller circuitry is disabled to reduce power consumption. In the shutdown mode, the controller's processor core is fully powered down and the software state is saved in memory (e.g., the memory module 20). In some embodiments, the process of starting up from the shutdown mode typically takes a substantial amount of time (e.g., on the order of thousands of clock cycles).

In some examples, the controller 22 also includes a timer 44. Timer or clock interrupts are used for scheduling tasks. Such interrupts typically invoke a scheduler, which may switch the currently executing thread/process to another thread/process by saving the current context in memory and loading another context.

Figure 2A:
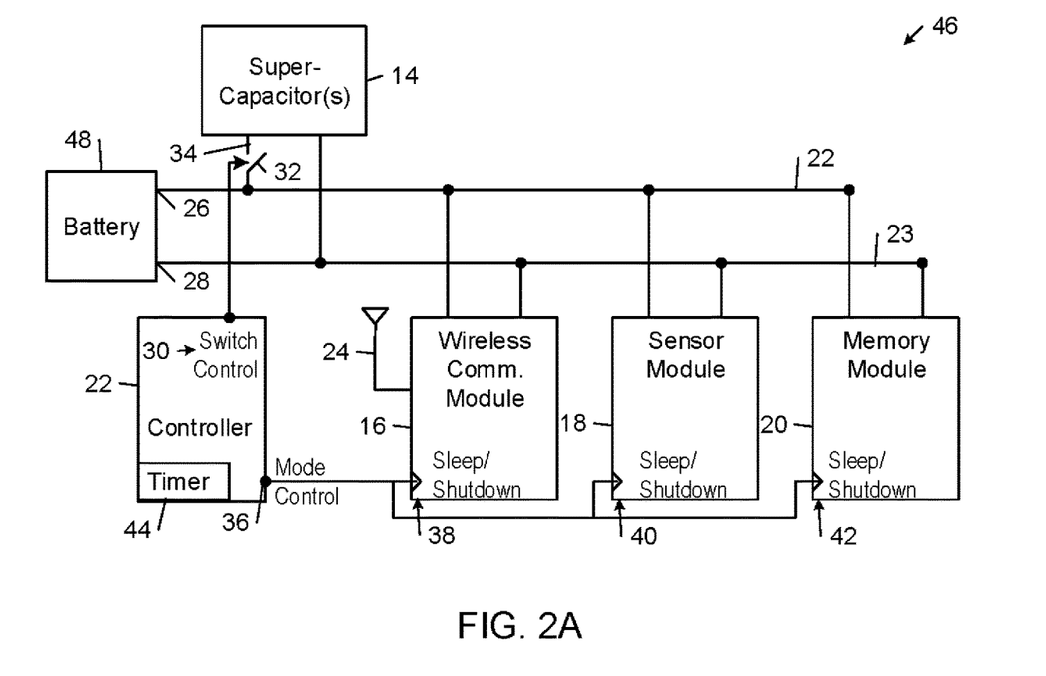
FIG. 2A is a schematic diagram of an IoT device that includes a battery, an example set of device modules, and an example of a system for powering the set of device modules.

FIG. 2A shows a schematic diagram of an example IoT device 46 that includes a battery energy source 48, a supercapacitor 14, an example set of device modules 16, 18, 20, and a controller 22 that manages the powering of and operations performed by the device modules 16, 18, 20. The battery energy source 48 may be, for example, a primary electrochemical cell battery or a secondary rechargeable battery.

Figure 2B:
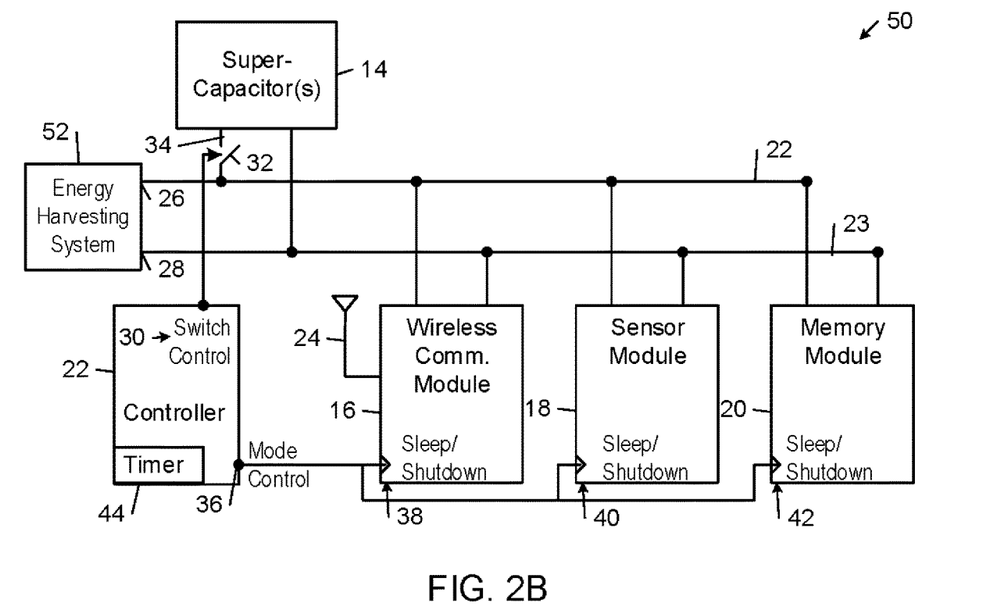
FIG. 2B is schematic diagram of an IoT device that includes an energy harvesting system, an example set of device modules, and an example of a system for powering the set of device modules.

FIG. 2B shows a schematic diagram of an example IoT device 50 that includes an energy harvesting system 52, a supercapacitor 14, an example set of device modules 16, 18, 20, and a controller 22 that manages the powering of and operations performed by the device modules 16, 18, 20. The energy harvesting system 52 may generate electrical power from energy sources in the ambient environment, including, for example, electro-magnetic waves (e.g., radio-frequency waves), solar radiation, thermal gradients, wind, and mechanical motion.

Figure 2C:
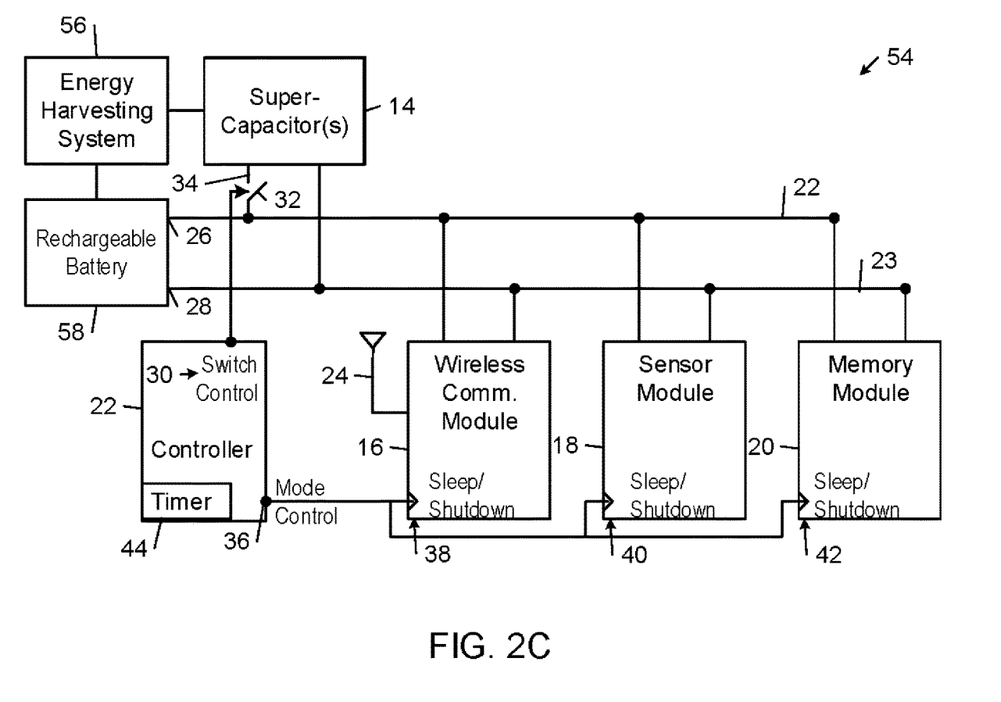
FIG. 2C is schematic diagram of an IoT device that includes an energy harvesting system, an example set of device modules, and an example of a system for powering the set of device modules.

FIG. 2C shows a schematic diagram of an example IoT device 54 that includes an energy harvesting system 56, a rechargeable battery 58, a supercapacitor 14, an example set of device modules 16, 18, 20, and a controller 22 that manages the powering of and operations performed by the device modules 16, 18, 20. The energy harvesting system 52 may generate electrical power from energy sources in the ambient environment, including, for example, electro-magnetic waves (e.g., radio-frequency waves), solar radiation, thermal gradients, wind, and mechanical motion. In the illustrated embodiment, the electrical power generated by the energy harvesting system 56 is used to charge the supercapacitor 14 and the rechargeable battery 58.

Figure 3:
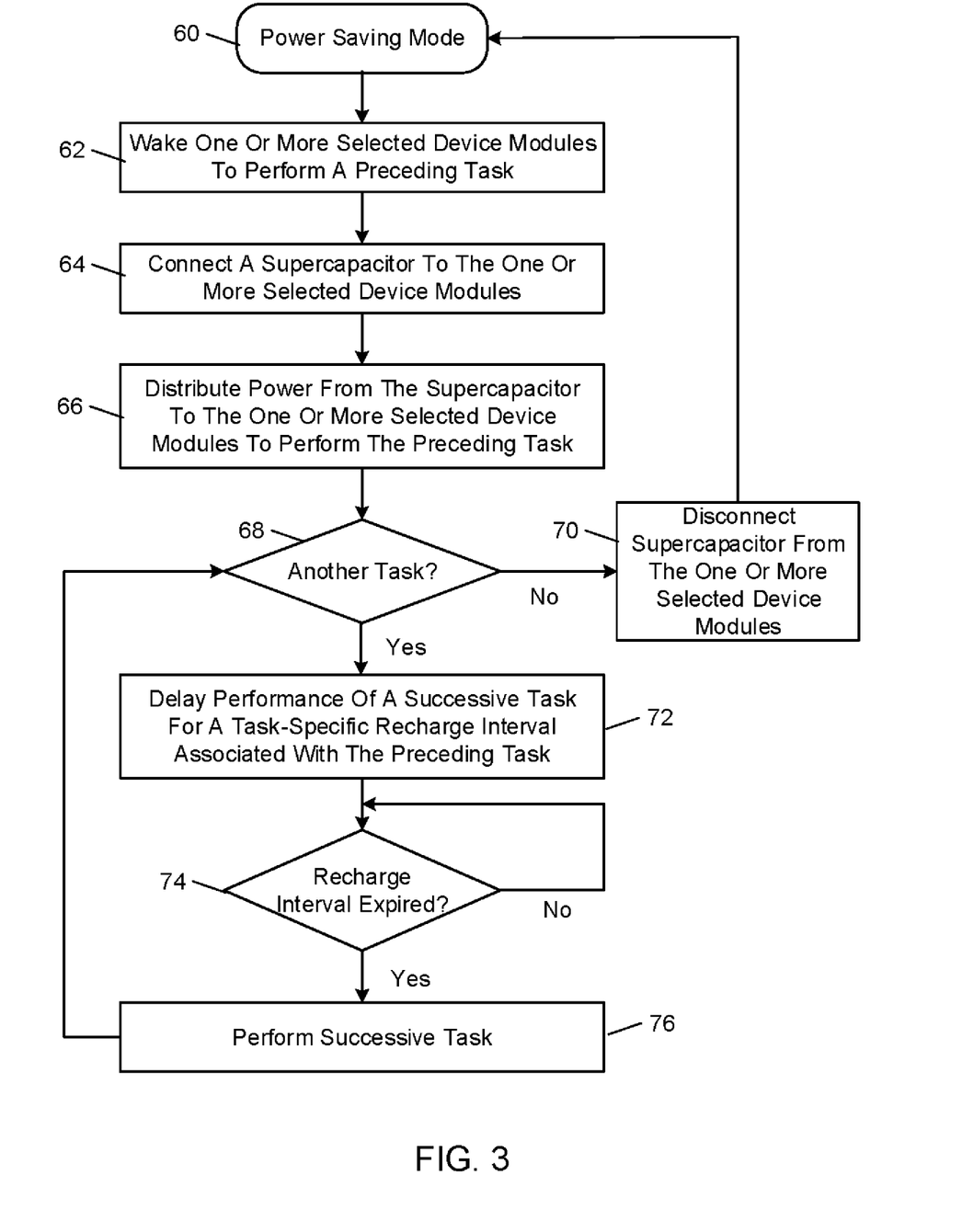
FIG. 3 is a flow diagram of a method of powering an example set of device modules.

FIG. 3 shows an example method of operation that can be performed by any of the example IoT devices 10, 46, 50, and 54. In the illustrated example, an IoT device initially is in a power saving mode (FIG. 3, block 60). Example power saving modes include the above-described sleep mode and shutdown mode. In some embodiments, the supercapacitor 14 may be charged by one or more energy sources that are available while in the power saving mode 60. In other examples, the IoT device may start in a method step other than the power saving mode 60.

In operation, the controller 22 wakes one or more selected device modules 16, 18, 20 to perform a preceding task (FIG. 3, block 62). In this process, the controller 22 may send a respective interrupt to the one or more selected device modules 16, 18, 20 to wake each of the one or more selected device modules 16, 18, 20 into the active mode. As used herein, the term "preceding task" means a task that immediately precedes a successive task.

After waking the one or more selected device modules 16, 18, 20, the controller 22 connects the supercapacitor 14 to the one or more selected device modules 16, 18, 20 (FIG. 3, block 64). In this process, the controller 22 toggles the switch 32 from an open state to a closed state to connect the positive terminal 34 of the supercapacitor 14 to the positive circuit power line 22. As the negative terminal 34 of the supercapacitor 14 is already connected to the negative circuit power line 23, the supercapacitor 14 begins to discharge as soon as the switch 32 is closed. One or more of the device modules 16, 18, 20 may be selected in parallel (i.e., at the same time) or serially.

After connecting the supercapacitor 14 to the one or more selected device modules 22, power is distributed from the supercapacitor 14 to the one or more selected device modules 22 to perform the preceding task (FIG. 3, block 66). In this process, current flows from the supercapacitor 14 over the power circuit lines 22, 23 and through the terminals of the selected device modules. Each of the illustrated embodiments 10, 46, 50, and 54, also includes one or more supplemental sources of electrical power that assists in providing a high operating current during wireless communications transmission and reception cycles, and avoiding a voltage drop during the high current pulse. Examples of the supplemental sources of electrical power include the energy source 12 in the IoT device 10 (FIG. 1), the battery 48 in the IoT device 46 (FIG. 2A), the energy harvesting system 52 in the IoT device 50 (FIG. 2B), and the energy harvesting system 56 and the rechargeable battery 58 in the IoT device 54 (FIG. 2C).

After the preceding task has been initiated or completed (FIG. 3, block 66), the controller 22 determines whether or not there is a successive task to be performed (FIG. 3, block 68). The successive task may be related to the preceding task, or it may be unrelated to the preceding task. In some examples, the successive task may be a scheduled task, or it may be an unscheduled or ad hoc task.

If there is no other task pending in a task queue (FIG. 3, block 68), the controller 22 disconnects the supercapacitor 14 from the one or more selected device modules 16, 18, 20 (FIG. 3, block 70). In this process, the controller 22 opens the respective switch 32 between the supercapacitor 14 and the respective positive power line 22, which enables the supercapacitor 14 to charge from one or more of the available energy sources 12, 48, 52, 56, 58. In some embodiments, the controller 22 also may set the one or more of the device modules 16, 18, 20 that were activated during the preceding cycle into a power saving mode (e.g., a sleep mode or shutdown mode).

In the illustrated embodiment, if there is another task pending in the task queue (FIG. 3, block 68), the controller 22 enters a delay mode in which the controller 22 delays performance of the successive task for a task-specific recharge interval associated with the preceding task (FIG. 3, block 72). In this process, the controller 22 retrieves a recharge interval value associated with the preceding task from a data structure (e.g., a table) stored in memory (e.g., a memory within the controller 22 or the memory module 20). In some embodiments, the recharge interval begins after the preceding task is completed. In some embodiments, after the recharge interval expires (FIG. 3, block 74), the controller 22 performs the successive task (FIG. 3, block 76).

In the illustrated embodiment, the controller 22 checks if there is another task pending in the queue (FIG. 3, block 68).

If there is no other task pending in the queue (FIG. 3, block 68), the controller 22 disconnects the supercapacitor 14 from the one or more selected device modules 16, 18, 20, which enables the supercapacitor 14 to charge from one or more of the available energy sources 12, 48, 52, 56, 58 (FIG. 3, block 70). If there is another task pending (FIG. 3, block 68), the controller 22 enters a delay mode in which the controller 22 delays performance of the successive task for a task-specific recharge interval associated with the preceding task (FIG. 3, block 72). In this process, the controller 22 disconnects the supercapacitor 14 from the one or more selected device modules 16, 18, 20, and opens the respective switch 32 between the supercapacitor 14 and the respective positive power line 22, which enables the supercapacitor 14 to charge from one or more of the available energy sources 12, 48, 52, 56, 58.

Figure 4:
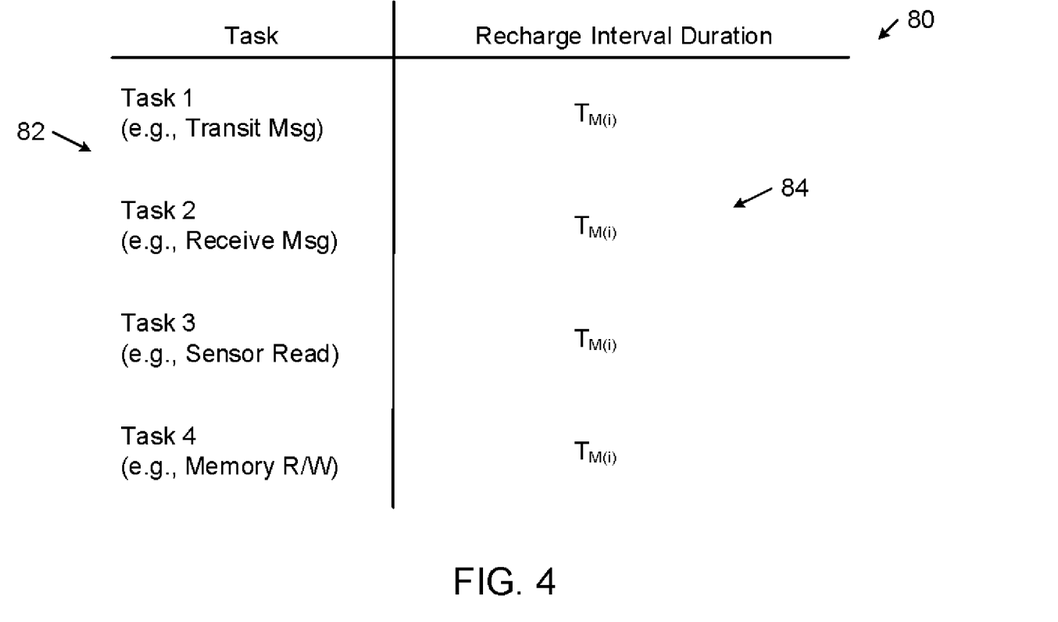
FIG. 4 is a table that includes example associations between tasks and respective task specific recharge intervals of time.

FIG. 4 shows an example of a task-specific recharge interval table 80 that associates a set of tasks 82 with a set of respective recharge interval durations 84. The set of tasks 82 includes a transmit message task (Task 1), a receive message task (Task 2), a sensor read task (Task 3), and a memory read/write task (Task 4). In the illustrated embodiment, for each type i of IoT device 10, 46, 50, 54, a respective recharge interval duration is empirically derived in a device-specific performance evaluation process. In this process the controller 22 empirically determines a respective minimum recharge interval duration ($T_{M(i)}$)) that enables each individual task in the set of tasks 82 to be completed without failure with a target level of confidence (e.g., 0.999 probability). For each type i of IoT device 10, 46, 50, 54, a respective minimum recharge interval duration ($T_{M(i)}$)) is associated with each task to be performed.

Figure 5:
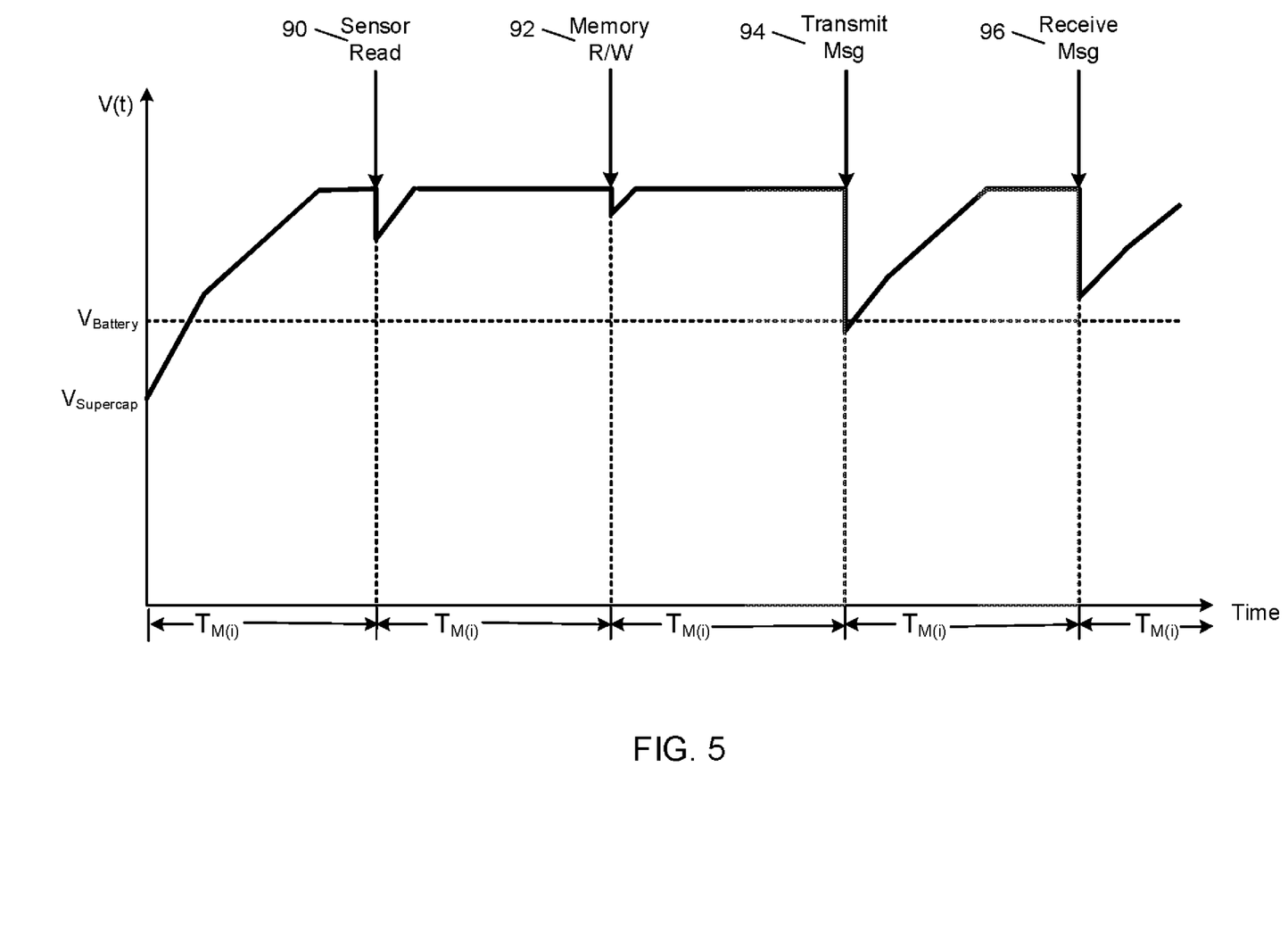
FIG. 5 shows examples of a supercapacitor voltage and a battery voltage as functions of time.

FIG. 5 shows examples of a supercapacitor voltage ($V_{Supercap}$) and a battery voltage ($V_{Battery}$) as functions of time for the second type of IoT device 46 (i.e., i=2). In this example, the recharge interval ($T_{M(2)}$) is a fixed period of time. This example shows a sequence of tasks that are performed by the IoT device 46 over time and the impact of those tasks on the voltage levels of the supercapacitor 14 and the battery 48. In the illustrated example, when the switch 32 is open, the battery 48 charges the supercapacitor 14 over time. Each task in the sequence of tasks is performed in a different respective period. The first period is a startup period during which the voltage level across the power lines 22, 23 increases to a maximum voltage level. At the start of the second period, the sensor module 18 performs a sensor read task 90, which results in a current draw and an associated voltage drop. At the beginning of the second period, the memory module 20 performs a read/write task 92, which results in a current draw and an associated voltage drop. At the beginning of the third period, the wireless communications module 16 performs a message transmission task 94, which results in a significant current draw and an associated voltage drop below the battery voltage $V_{Battery}$. At the beginning of the fourth period, the wireless communications module 16 performs a message reception task 96, which results in a significant current draw and an associated voltage drop.

As shown diagrammatically in FIG. 5, each task in the sequence of tasks was performed in a respective constant time period ($T_{M(2)}$), which can be tailored to be long enough to avoid debilitating current drawdowns or voltage drops, without requiring means for measuring and evaluating voltages or charge levels associated with various circuit components, including the supercapacitor of the IoT device. In this way, the embodiments described herein can be made smaller, lighter, more energy efficient, cheaper, and with fewer points of potential failure.

Figure 6:
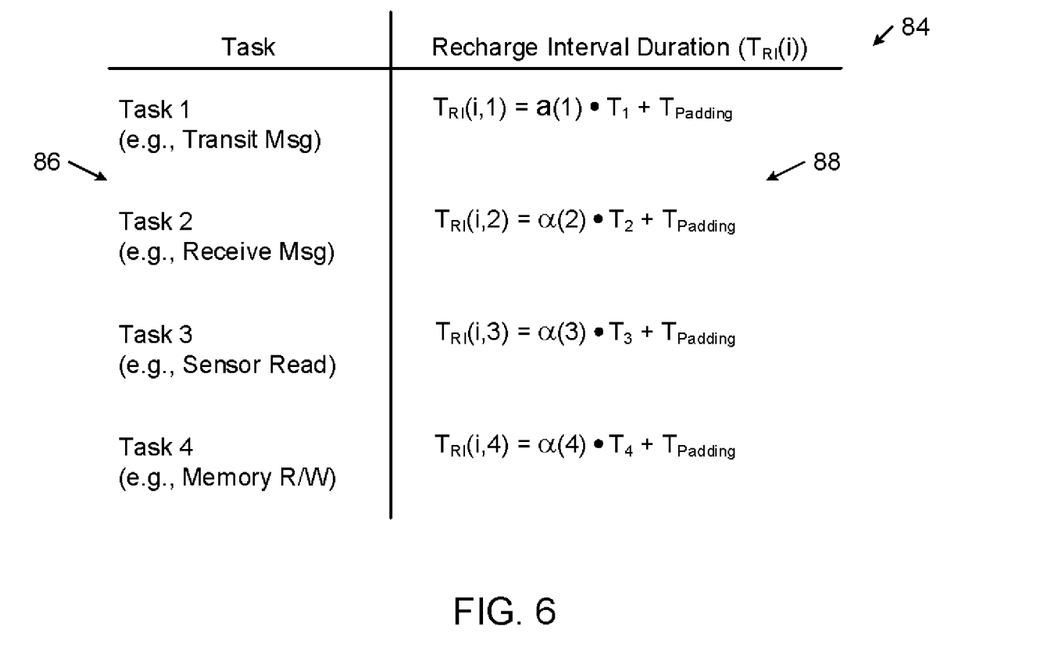
FIG. 6 is a table that includes example associations between tasks and respective task specific recharge intervals of time.

FIG. 6 shows an example of a task-specific recharge interval table 84 that associates a set of tasks 86 with a set of recharge interval times 88. The set of tasks 86 includes a transmit message task (Task 1), a receive message task (Task 2), a sensor read task (Task 3), and a memory read/write task (Task 4). In the illustrated embodiment, for each type of IoT device 10, 46, 50, 54, a respective recharge interval is derived in an evaluation process during which the controller 22 measures the time required to complete each task j in the set of tasks 86. For each type i of IoT device 10, 46, 50, 54, a respective recharge interval duration ($T_{RI}(i,j)$) is determined and associated with each task j to be performed, where $T_{RI}(i,j)=\alpha(i) T_i+T_{Padding}$, where i designates the type of IoT device, and j designates the Task to be performed (e.g., Task 1, Task 2, Task 3, and Task 4). In some embodiments, the padding ($T_{Padding}$) may be omitted.

Figure 7:
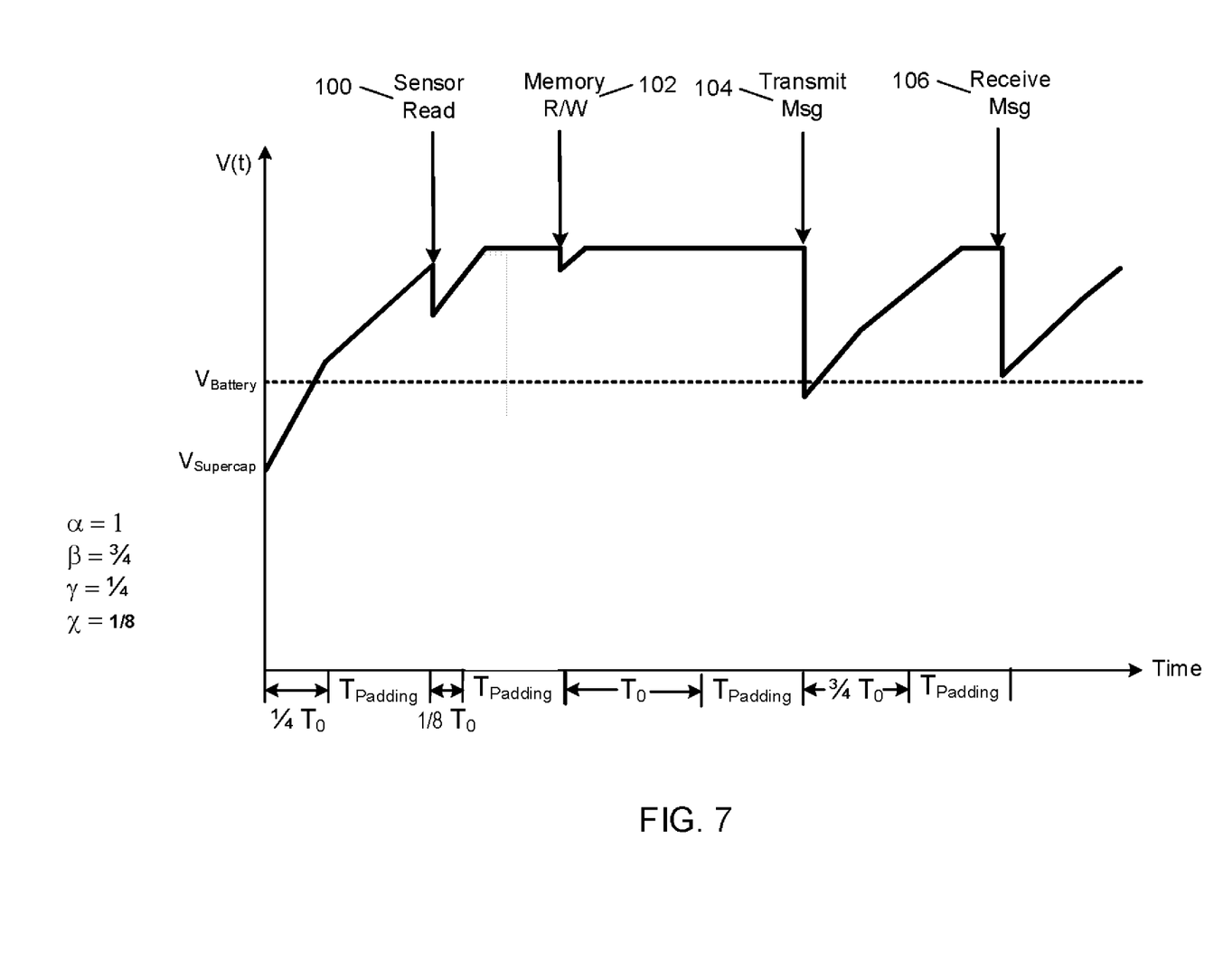
FIG. 7 shows examples of a supercapacitor voltage and a battery voltage as functions of time.

FIG. 7 shows examples of a supercapacitor voltage ($V_{Supercap}$) and a battery voltage ($V_{Battery}$) as functions of time for the second type of IoT device 46. In this example, the recharge interval ($T_{RI}(i,j)$) is a task-specific period of time that varies by task j and by IoT device type i. This example shows a sequence of tasks that are performed by the IoT device 46 over time and the impact of those tasks on the voltage levels of the supercapacitor 14 and the battery 48. In the illustrated example, when the switch 32 is open, the battery 48 charges the supercapacitor 14 over time. Each task in the sequence of tasks is performed in a different respective period. The first period is a startup period during which the voltage level across the power lines 22, 23 increases to a level below the maximum voltage level. At the beginning of the second period, the sensor module 18 performs a sensor read task 100, which results in a current draw and an associated voltage drop. At the beginning of the second period, the memory module 20 performs a read/write task 102, which results in a current draw and an associated voltage drop. At the beginning of the third period, the wireless communications module 16 performs a message transmission task 104, which results in a significant current draw and an associated voltage drop below the battery voltage level $V_{Battery}$. At the beginning of the fourth period, the wireless communications module 16 performs a message reception task 106, which results in a significant current draw and an associated voltage drop.

As shown diagrammatically in FIG. 7, each task in the sequence of tasks was performed in a respective task-specific time period ($T_{RI}(i,j)$), which can be tailored to be long enough to avoid debilitating current drawdowns or voltage drops without requiring means for measuring and evaluating voltages or charge levels associated with various circuit components, including the supercapacitor. In this way, the embodiments described herein can be made smaller, lighter, more energy efficient, cheaper, and with fewer points of potential failure.

Exemplary Computer Apparatus

Figure 8:
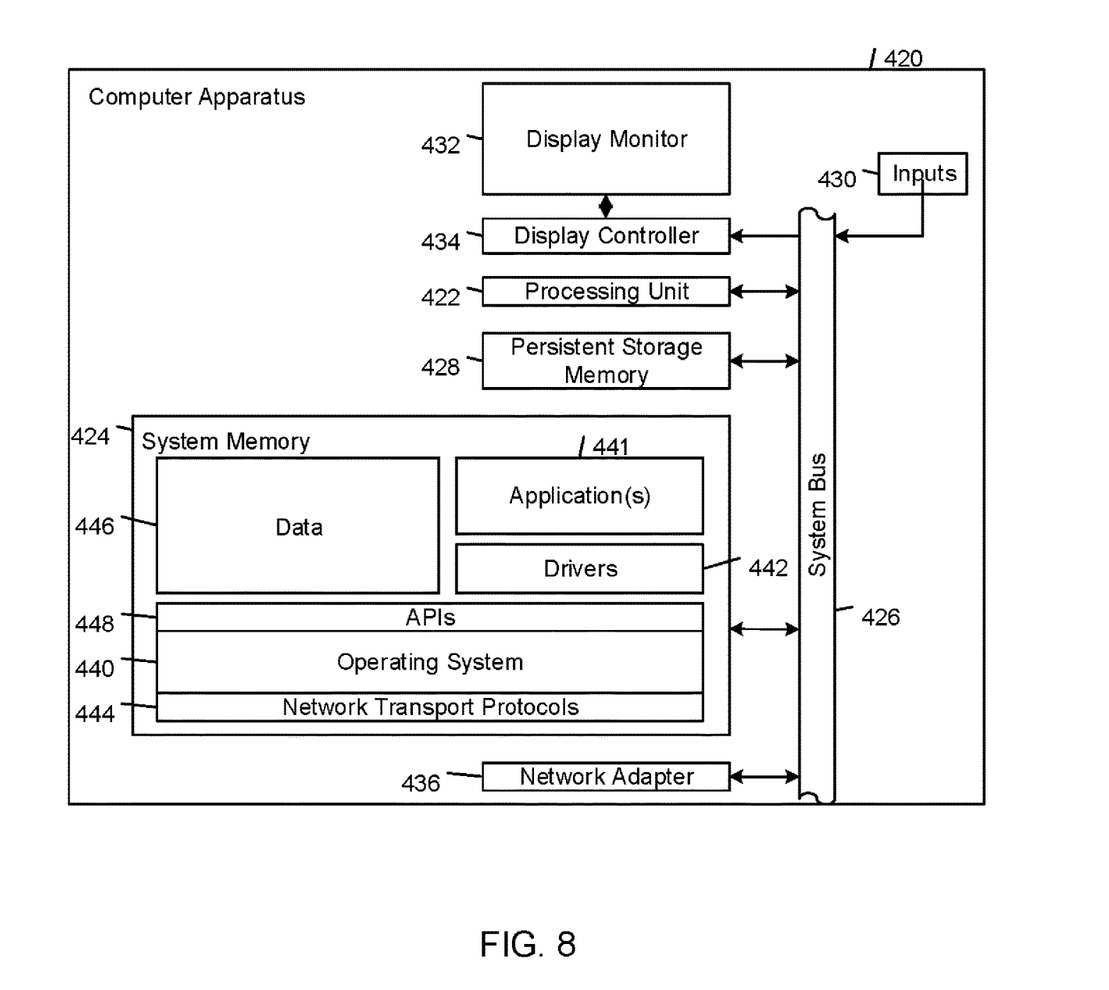
FIG. 8 is a block diagram of an example computer apparatus.

FIG. 8 shows an example embodiment of computer apparatus that is configured to implement one or more of the computing systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 320 also may include other input/output hardware (e.g., peripheral output devices, such as speakers and a printer). The computer apparatus 420 connects to other network nodes through a network adapter 336 (also referred to as a "network interface card" or NIC).

A number of program modules may be stored in the system memory 424, including application programming interfaces 438 (APIs), an operating system (OS) 440 (e.g., the Windows® operating system available from Microsoft Corporation of Redmond, Wash. U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A device module system, comprising:
an energy source;
a supercapacitor chargeable by the energy source and configured to source power to one or more device modules; and
a controller configured to distribute power from the supercapacitor to a selected one of the one or more device modules based on one or more instructions that, when executed by the controller, causes the controller to perform operations comprising: distributing power from the supercapacitor to the selected device module to perform a preceding task; after the preceding task is performed, delaying performance of a successive task for a task-specific recharge interval associated with the preceding task, without measuring a voltage level or a charge level of the supercapacitor; and after the task-specific recharge interval has expired, performing the successive task.

2. The device module system of claim 1, further comprising a wireless transmitter device module operable to perform a wireless transmission task comprising transmitting data wirelessly to a remote receiver.

3. The device module system of claim 1, further comprising a wireless receiver device module operable to perform a wireless reception task comprising receiving data wirelessly from a remote transmitter.

4. The device module system of claim 1, further comprising a sensor device module operable to perform a sensing task comprising generating sensor data.

5. The device module system of claim 1, further comprising a memory module that stores respective associations between tasks and task-specific recharge intervals.

6. The device module system of claim 1, wherein, based on an instruction to perform a particular task with a designated one of the one or more device modules, the controller is configured to retrieve from a memory device a task-specific recharge interval value associated with a task that immediately precedes the particular task, and delay performance of the successive task for the retrieved task-specific recharge interval.

7. The device module system of claim 1, wherein, based on an instruction to perform a particular task with a particular device module, the controller sets one or more other device modules into a power saving mode and directs the particular device module to perform the particular task.

8. The device module system of claim 1, further comprising a switch operable to electrically couple the supercapacitor to the energy source, wherein during the task-specific recharge interval the controller is configured to open the switch to charge the supercapacitor, and set one or more of the device modules into a power saving mode.

9. The device module system of claim 1, wherein the energy source comprises an energy harvesting module.

10. The device module system of claim 1, further comprising a rechargeable battery.

11. A device module task scheduling method, comprising:
providing energy from an energy source;
sourcing energy from the energy source to charge a supercapacitor and one or more device modules; and
by a controller: distributing power from the supercapacitor to one of the device modules to perform a preceding task; after the preceding task is performed, delaying performance of a successive task for a task-specific recharge interval associated with the preceding task, without measuring a voltage level or a charge level of the supercapacitor; and after the task-specific recharge interval has expired, performing the successive task.

12. The device module task scheduling method of claim 11, further comprising by the controller, executing an instruction to perform a particular task with a designated one of the one or more device modules, wherein the executing comprises retrieving from a memory device a task-specific recharge interval value associated with a task that immediately precedes the particular task, and delaying performance of the particular task for the retrieved task-specific recharge interval.

13. The device module task scheduling method of claim 11, further comprising by the controller: executing instructions to perform a particular task with a particular device module; configuring one or more other device modules into a power saving mode; and directing the particular device module to perform the particular task.

14. The device module task scheduling method of claim 11, further comprising by the controller, closing a switch on a power line between the supercapacitor and the energy source, and configuring one or more of the device modules into a power saving mode during the task-specific recharge interval.

15. A computer program product for execution by a computer system and comprising at least one non-transitory computer-readable medium having computer-readable program code portions embodied therein, the computer-readable program code portions comprising:
    an executable code portion to selectively distribute power from an energy source to charge a supercapacitor, a controller, and one or more device modules;
    an executable code portion to distribute power from the supercapacitor to a selected one of the one or more device modules to perform a preceding task;
    an executable code portion to, after the preceding task is performed, delay performance of a successive device module task for a task-specific recharge interval associated with the preceding task, without measuring a voltage level or a charge level of the supercapacitor; and
    an executable code portion to, after the task-specific recharge interval has expired, perform the successive device module task.

16. The computer program product of claim 15, further comprising: an executable code portion to perform a particular task with a designated one of the one or more device modules: an executable code portion to retrieve from a memory device a task-specific recharge interval value associated with a task that immediately precedes the particular task in a task queue; and an executable code portion to delay performance of the particular task for the retrieved task-specific recharge interval.

17. The computer program product of claim 15, further comprising:
    an executable code portion to perform particular task with a particular device module;
    an executable code portion to set one or more other device modules into a power saving mode; and
    an executable code portion to direct the particular device module to perform the particular task.

18. The computer program product of claim 15, further comprising: an executable code portion to open a switch on a power line between the supercapacitor and the energy source; and an executable code portion to set one or more of the device modules into a power saving mode during the task-specific recharge interval.

* * * * *